United States Patent
Qiu (10) Patent No.: US 11,641,881 B2
(45) Date of Patent: May 9, 2023

(54) ELECTRONIC CIGARETTE AND POWER SUPPLY STRUCTURE THEREOF

(71) Applicant: CHANGZHOU PATENT ELECTRONIC TECHNOLOGY CO., LTD., Changzhou (CN)

(72) Inventor: Weihua Qiu, Changzhou (CN)

(73) Assignee: CHANGZHOU PATENT ELECTRONIC TECHNOLOGY CO., LTD., Changzhou (CN)

( * ) Notice: Subject to any disclaimer, the term of this patent is extended or adjusted under 35 U.S.C. 154(b) by 1022 days.

(21) Appl. No.: 16/341,888

(22) PCT Filed: Oct. 11, 2017

(86) PCT No.: PCT/CN2017/105613
§ 371 (c)(1),
(2) Date: Apr. 12, 2019

(87) PCT Pub. No.: WO2018/068710
PCT Pub. Date: Apr. 19, 2018

(65) Prior Publication Data
US 2019/0245371 A1   Aug. 8, 2019

(30) Foreign Application Priority Data

Oct. 12, 2016   (CN) .......................... 201610892835.1

(51) Int. Cl.
*H02J 7/00* (2006.01)
*A24F 40/50* (2020.01)
(Continued)

(52) U.S. Cl.
CPC .............. *A24F 40/50* (2020.01); *A24F 40/90* (2020.01); *H02J 7/0016* (2013.01);
(Continued)

(58) Field of Classification Search
CPC ....................................................... H02J 7/007
(Continued)

(56) References Cited

U.S. PATENT DOCUMENTS 6,373,327 B1 * 4/2002 Nakamura ............ H02M 3/073
327/536
6,784,638 B2    8/2004 Yang
(Continued)

FOREIGN PATENT DOCUMENTS

CN       1848587 A      10/2006
CN       1848587 B       3/2012
(Continued)

OTHER PUBLICATIONS

Motorola Inc., "A Unique Converter Configuration Provides Step-up/Down Functions", 1985, Motorola Literature Distribution, AN854, p. 1-4 (Year: 1985).*

*Primary Examiner* — Yalkew Fantu
(74) *Attorney, Agent, or Firm* — Cheng-Ju Chiang (57) ABSTRACT

A power supply structure and an electronic cigarette having same are provided. The power supply structure includes at least two rechargeable batteries connected in series, a charging circuit connected to the rechargeable batteries and used to charge the rechargeable batteries, and a switching circuit connected to the at least two rechargeable batteries. The switching circuit is used to switch the at least two rechargeable batteries into battery series circuits having different number of rechargeable batteries connected in series. The charging circuit is used to detect the voltages of the battery series circuits and convert a standard charging voltage into different charging voltages for charging the battery series circuits according to the detected voltages.

6 Claims, 7 Drawing Sheets

(51) Int. Cl.
*A24F 40/90* (2020.01)
*A24F 40/40* (2020.01)

(52) U.S. Cl.
CPC .......... *H02J 7/0018* (2013.01); *H02J 7/0024* (2013.01); *H02J 7/007182* (2020.01); *A24F 40/40* (2020.01)

(58) Field of Classification Search
USPC ........................................................ 320/107
See application file for complete search history.

(56) References Cited

U.S. PATENT DOCUMENTS

| | | | | |
|---|---|---|---|---|
| 2004/0145345 | A1 | 7/2004 | Yang | |
| 2007/0069689 | A1* | 3/2007 | Shum | H01M 10/441 |
| | | | | 320/114 |
| 2008/0309286 | A1* | 12/2008 | Hoff | H02J 7/0019 |
| | | | | 320/162 |
| 2010/0289461 | A1* | 11/2010 | Wang | H02M 1/4208 |
| | | | | 323/205 |
| 2012/0139471 | A1* | 6/2012 | Dubovsky | H01M 10/465 |
| | | | | 320/101 |
| 2012/0299661 | A1* | 11/2012 | Williams | H03F 1/0277 |
| | | | | 330/296 |
| 2013/0169228 | A1 | 7/2013 | Yang | |
| 2014/0002010 | A1* | 1/2014 | Paczkowski | H02J 7/0042 |
| | | | | 320/107 |
| 2014/0060527 | A1* | 3/2014 | Liu | A24F 40/30 |
| | | | | 128/202.21 |
| 2015/0015187 | A1 | 1/2015 | Xiang | |
| 2016/0226286 | A1 | 8/2016 | Xiang | |

FOREIGN PATENT DOCUMENTS

| | | |
|---|---|---|
| CN | 103154759 A | 6/2013 |
| CN | 104253469 A | 12/2014 |
| CN | 204216616 U | 3/2015 |
| CN | 104614674 A | 5/2015 |
| CN | 204969478 U | 1/2016 |
| CN | 105471049 A | 4/2016 |
| CN | 205377357 U | 7/2016 |
| CN | 205489622 U | 8/2016 |
| CN | 205583749 U | 9/2016 |
| CN | 106410897 A | 2/2017 |

* cited by examiner

ELECTRONIC CIGARETTE AND POWER SUPPLY STRUCTURE THEREOF

CROSS REFERENCE TO RELATED APPLICATION

This application is a 35 U.S.C. § 371 National Phase conversion of International (PCT) Patent Application No. PCT/CN2017/105613, filed on Oct. 11, 2017, which claims the priority of Chinese Patent Application No. 201610892835.1, filed on Oct. 12, 2016. The contents of the above-identified applications are incorporated herein by reference. The PCT International Patent Application was filed and published in Chinese.

TECHNICAL FIELD

The present disclosure relates to the technical field of electronic cigarettes, and in particular, to an electronic cigarette and a power supply structure thereof.

BACKGROUND

As a portable and easy-to-use power source, rechargeable batteries have been widely used. Usually, depending on the power supply voltages, different numbers of rechargeable batteries are connected in series to achieve the effect of adapting to different power supply voltages. However, in the conventional schemes, there is only design schemes of power supply structure for charging and discharging a single one or two and three batteries connected in series, and the single circuit cannot be switched to meet the requirement for one, two, and three batteries connected in series. Therefore, when we increase or decrease the number of batteries during charging, it is necessary to replace the adapted charging and discharging power supply structure at the same time, resulting in poor adaptability of the power supply structure, which is not conducive to people's use.

SUMMARY

In view of the above, it is necessary to provide a power supply structure which can be charged and discharged using different numbers of rechargeable batteries. In addition, an electronic cigarette including the power supply structure is also provided.

A power supply structure includes at least two rechargeable batteries connected in series and a charging circuit connected to the rechargeable batteries for charging the rechargeable batteries; wherein the power supply structure further comprises a switching circuit connected to the at least two rechargeable batteries, the switching circuit is configured for regulating the number of the rechargeable batteries connected in series to form different battery series circuits; the charging circuit is configured for detecting the voltages of the battery series circuits, and for converting a standard charging voltage to different charging voltages so as to be supplied to the battery series circuits for charging according to the detected voltages.

In one embodiment, the charging circuit comprises a charging interface for accessing an external power source to obtain the standard charging voltage, the charging interface is respectively connected to the battery series circuits through a boosting module and a buck module.

In one embodiment, the charging circuit further comprises a controller and a voltage sampling module, the controller is respectively connected to the boosting module and the buck module, the voltage sampling module is connected between the controller and the battery series circuits and configured for detecting the voltages of the battery series circuits and feeding back to the controller, the controller is configured for controlling the boosting module or the buck module to operate according to the detected voltages.

In one embodiment, the boosting module comprises a first switch, a boosting charging circuit, a boosting charging protection circuit and a second switch connected sequentially in series.

In one embodiment, the boosting charging circuit comprises a voltage boosting chip, a logic switching transistor and a dual input AND gate chip, a first input terminal of the voltage boosting chip is connected to the charging interface, and a second input terminal is connected to the logic switching transistor and the dual input AND gate chip.

In one embodiment, the buck module comprises a third switch, a buck charging circuit, a buck charging protection circuit and a fourth switch connected sequentially in series.

In one embodiment, the buck charging circuit comprises a voltage conversion chip and a logic switching transistor, an input end of the voltage conversion chip is connected to the charging interface, and an output end is connected to the logic switching transistor.

In one embodiment, the charging interface is a USB interface.

In one embodiment, the voltage sampling module comprises voltage sampling units equaling to the number of the rechargeable batteries, and each voltage sampling unit collects the voltage of a corresponding rechargeable battery and feeds back to the controller.

An electronic cigarette includes an atomizer and a power supply structure as described above, the power supply structure is connected to the atomizer for supplying power to the atomizer.

The above power supply structure realizes that the same circuit can satisfy the switching of charging one or more batteries connected in series. The number of batteries is identified by detecting the voltage, and a corresponding charging scheme is provided according to the corresponding number of batteries. Specifically, when the battery is one, the battery is charged by a buck scheme; when the battery is two or more, the batteries are charged by a boosting scheme. The present disclosure solves the problem that the existing power supply structure has poor adaptability and is not conducive to people's use.

DETAILED DESCRIPTION OF PREFERRED EMBODIMENTS

The technical solutions in the embodiments of the present disclosure are clearly and fully described below with reference to the accompanying drawings in the embodiments of the present disclosure. It is obvious that the described embodiments are a part of the embodiments of the present disclosure, and not all of the embodiments. All other embodiments obtained by a person of ordinary skill in the art based on the embodiments of the present disclosure without creative efforts are within the scope of the present disclosure.

Figure 1:
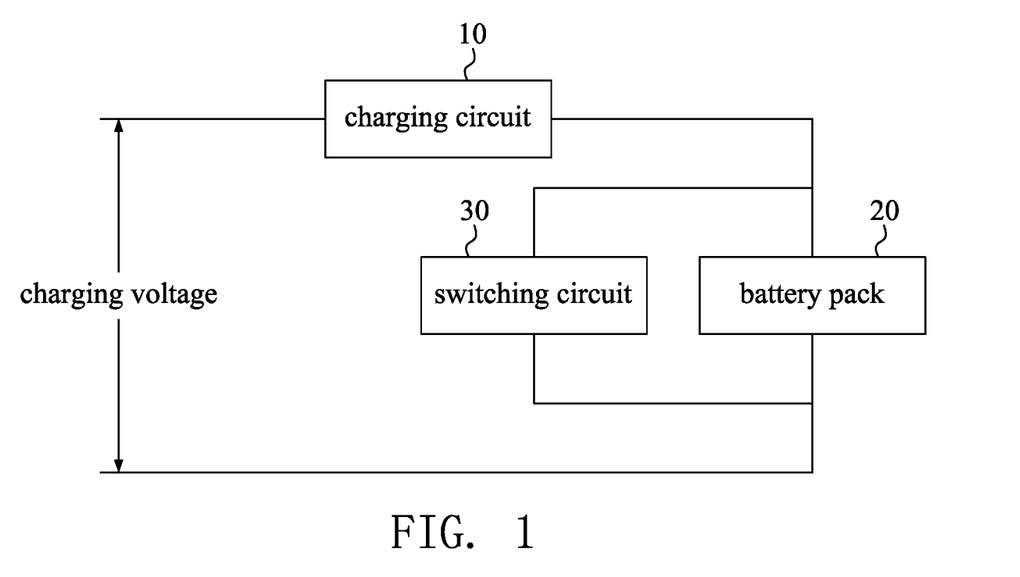
FIG. 1 is a block diagram of a power supply structure according to an embodiment.

As shown in FIG. 1, it is a block diagram of a power supply structure according to an embodiment. The power supply structure includes a charging circuit 10, a battery pack 20 including at least two rechargeable batteries, and a switching circuit 30.

The charging circuit 10 is connected in series with the battery pack 20 for charging the battery pack 20. The switching circuit 30 is configured for switching the at least two rechargeable batteries to a battery series circuit having a different number of rechargeable batteries connected in series.

Figure 2:
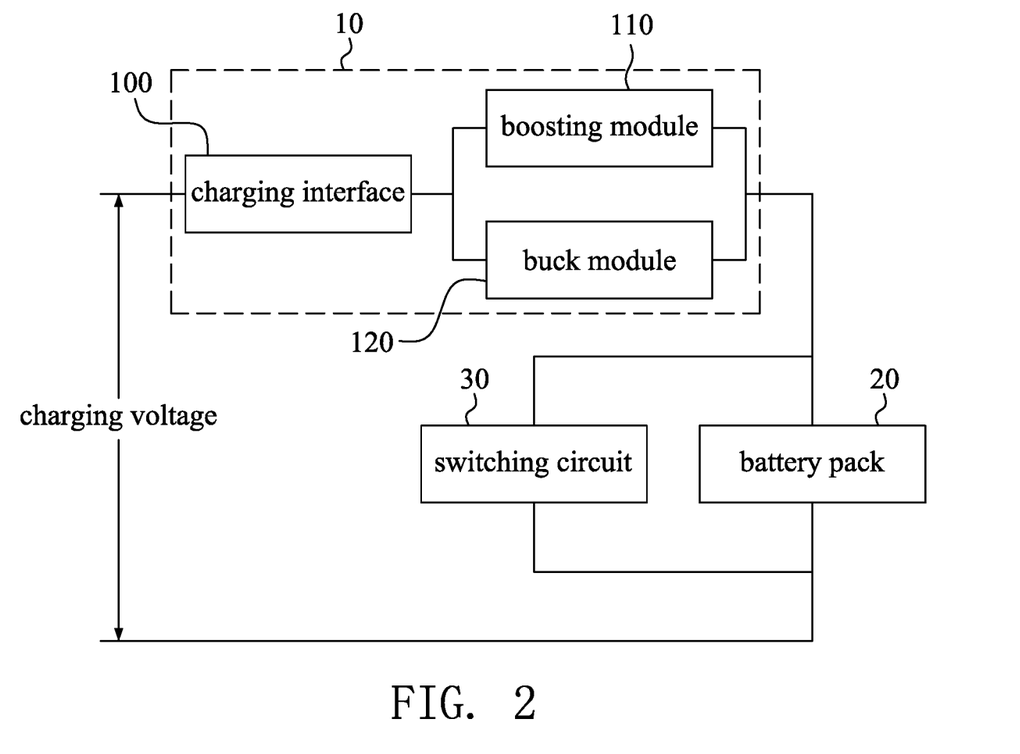
FIG. 2 is a block diagram of a power supply structure according to another embodiment.

In one embodiment, as shown in FIG. 2, the charging circuit 10 includes a charging interface 100, a boosting module 110, and a buck module 120. The charging interface 100 is connected to the battery pack 20 selectively through the boosting module 110 and the buck module 120, and the charging interface 100 is used to access an external power source to obtain a standard charging voltage. In one embodiment, the boosting module 110 and the buck module 120 may correspond to multiple batteries and a single battery, respectively. Specifically, assuming that the standard charging voltage is 5V and the standard voltage of one rechargeable battery is 4.2V, then when there is only one rechargeable battery in the circuit (the battery pack 20 has only one rechargeable battery) for charging, the buck module 120 is connected to the battery pack 20 for charging the battery; and when there are multiple rechargeable batteries in the circuit (the battery pack 20 includes a plurality of rechargeable batteries) for charging, the boosting module 110 is connected to the battery pack 20 for charging the multiple batteries.

Figure 3:
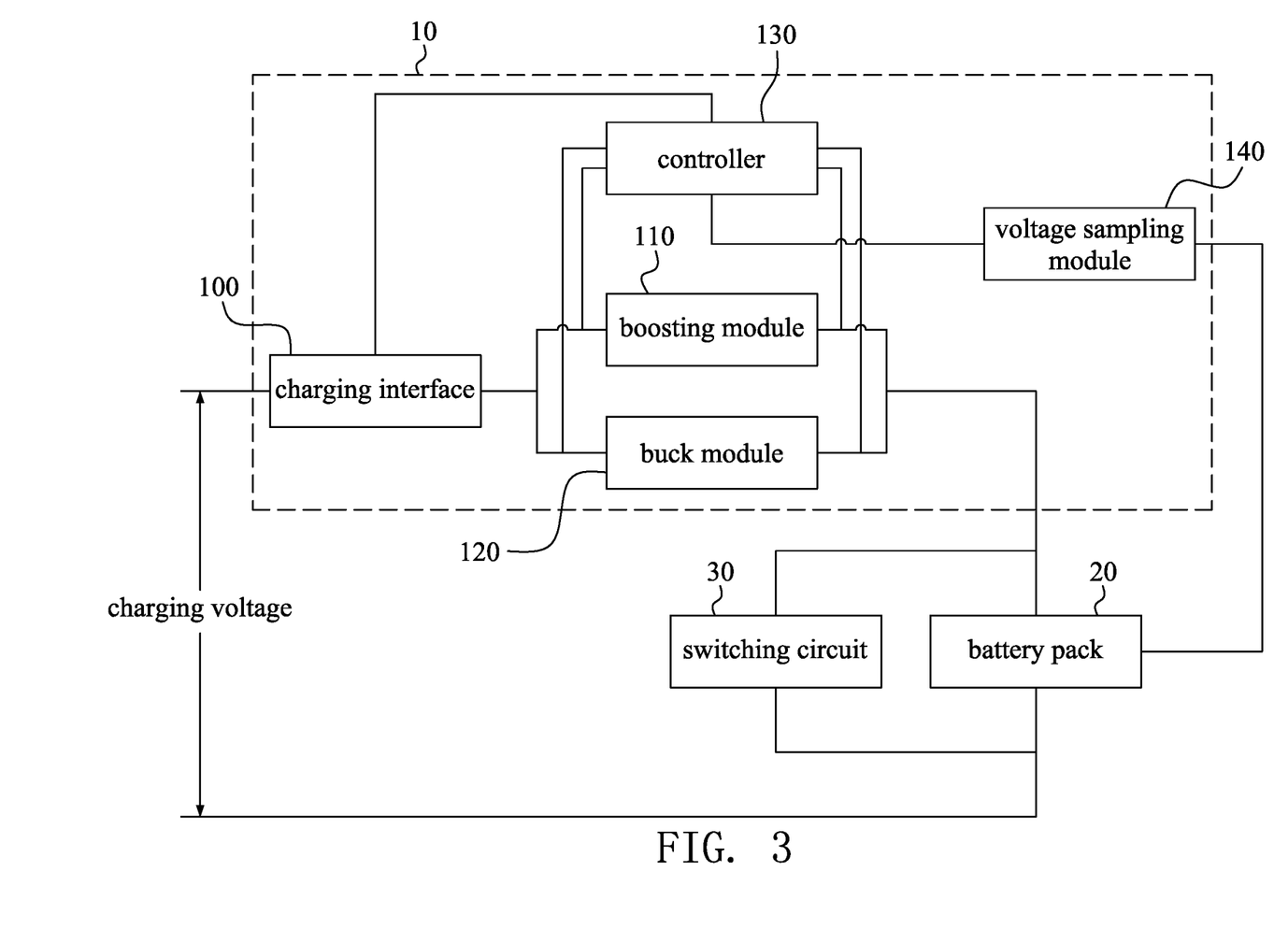
FIG. 3 is a block diagram of a power supply structure according to still another embodiment.

Further, as shown in FIG. 3, the charging circuit 10 may further include a controller 130 and a voltage sampling module 140. The controller 130 is connected to the boosting module 110 and the buck module 120, respectively. The voltage sampling module 140 includes voltage sampling units that are equal to the number of rechargeable batteries. Each voltage sampling unit collects the voltage of a corresponding rechargeable battery and feeds back to the controller 130. By detecting the current voltage using the voltage sampling module 140, the number of rechargeable batteries in the circuit that need to be charged are identified. Because the charging voltage needs to follow the national standard, i.e., the charging voltage should be 5V, and the maximum voltage of a single 18650 lithium battery is usually 4.2V, when there is only one rechargeable battery that needs to be charged, a buck circuit is therefore needed to ensure the charging safety, so the controller 130 is connected to the buck module 120 and disconnected from the boosting module 110, to charge for one rechargeable battery; when there are two or more rechargeable batteries that need to be charged, the highest voltage of the multiple rechargeable batteries is 8.4V or higher, and a boosting charging is required, so the controller 130 is disconnected from the buck module 120 and connected to the boosting module 110, to improve the charging efficiency and ensure the rechargeable batteries to be charged normally.

In one embodiment, the switching circuit 30 may be switches, and a corresponding switch is connected in parallel with two ends of each rechargeable battery. When the switch is turned on, the rechargeable battery connected in parallel with the switch is short-circuited, and the charging circuit 10 does not charge the rechargeable battery; when the switch is turned off, the rechargeable battery connected in parallel with the switch is connected to the charging circuit 10, and the charging circuit 10 charges the rechargeable battery. Similarly, the switching circuit 30 may also be an electromagnetic relay, or other circuits or electric components having similar functions.

In one embodiment, the switching circuit 30 may further include a charging protection circuit. When all the batteries are fully charged, the charging protection circuit will provide a signal to the controller 130, so that the controller 130 turns off the charging mode to finish the charging process of the batteries, thereby avoiding battery damage due to overcharging of the batteries.

Figure 4:
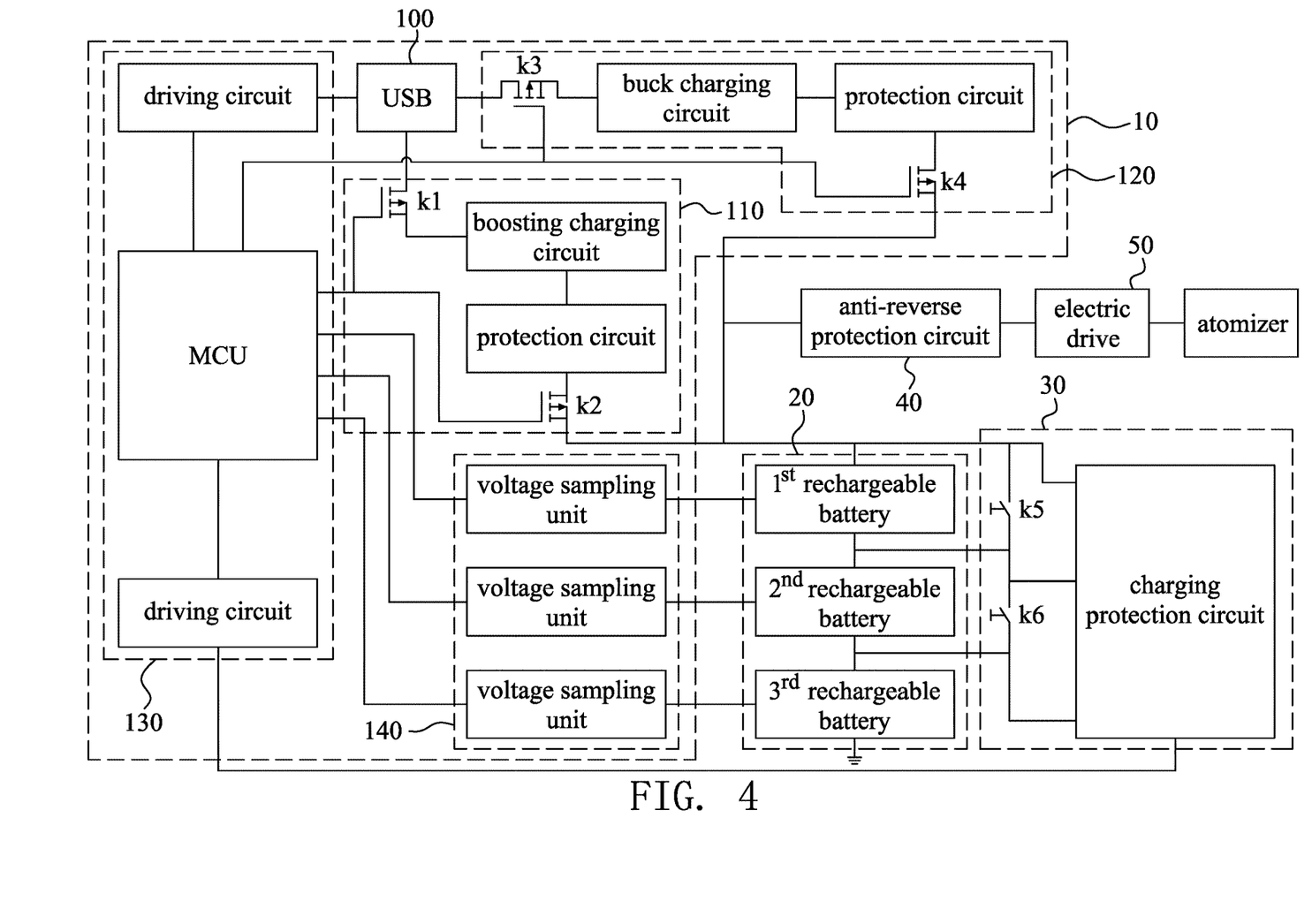
FIG. 4 is a block diagram of a power supply structure according to a further embodiment.

As shown in FIG. 4, it is a working principle diagram of a power supply structure according to an embodiment. In this embodiment, only three batteries are taken as an example for description. The power supply structure includes a charging circuit 10, a battery pack 20, a switching circuit 30, an anti-reverse protection circuit 40, and an electric drive 50.

The charging circuit 10 includes a charging interface 100, a boosting module 110, a buck module 120, a controller 130, and a voltage sampling module 140.

The boosting module 110 includes a first switch K1, a boosting charging circuit, a protection circuit and a second switch K2 connected sequentially in series, wherein one end of the first switch K1 and one end of the second switch K2 are connected to the MCU, the other end of the first switch K1 is connected to one end of the boosting charging circuit of the boosting module 110, the other end of the second switch K2 is connected to one end of the protection circuit of the boosting module 110, and the other end of the boosting charging circuit of the boosting module 110 is connected to the other end of the protection circuit of the boosting module 110. The buck module 120 includes a third switch K3, a buck charging circuit, a protection circuit and a fourth switch K4 connected sequentially in series, wherein one end of the third switch K3 and one end of the fourth switch K4 are connected to the MCU, the other end of the third switch K3 is connected to one end of the buck charging circuit of the buck module 120, the other end of the fourth switch K4 is connected to one end of the protection circuit of the buck module 120, and the other end of the buck charging circuit of the buck module 120 is connected to the other end of the protection circuit of the buck module 120. By detecting the current voltage using the voltage sampling module 140, the number of rechargeable batteries in the battery pack 20 is obtained, and according to the detected number of rechargeable batteries in the battery pack 20, it is determined that the charging circuit 10 is operated by the boosting module 110 or the bucking module 120.

The controller 130 includes a microcontroller (MCU) and driving circuits. Each of the rechargeable batteries in the battery pack 20 has a voltage signal connected to the MCU. When the controller 130 determines that there is only one rechargeable battery, the MCU controls the third switch K3 and the fourth switch K4 to be turned on, and simultaneously, controls the first switch K1 and the second switch K2 to be turned off, so that the single rechargeable battery is charged by the buck module 120; when the controller 130 determines that the number of rechargeable batteries is greater than one, the MCU controls the third switch K3 and the fourth switch K4 to be turned off, and simultaneously, controls the first switch K1 and the second switch K2 to be turned on, so that the at least two rechargeable batteries are charged by the boosting module 110. During the charging process, the MCU judges whether the battery is fully charged by sampling the voltage signal of each rechargeable battery. When all the rechargeable batteries are fully charged, the MCU will provide a signal to the driving circuits through software, to tell the driving circuits to turn off the charging mode.

The switching circuit 30 includes a mechanical switch K5 connected in parallel with two ends of the $1^{st}$ rechargeable battery, a mechanical switch K6 connected in parallel with two ends of the $2^{st}$ rechargeable battery, and a charging protection circuit. The mechanical switches K5, K6 are used to regulate the number of rechargeable batteries connected to the circuit. When the mechanical switch K5 is turned on, the $1^{st}$ rechargeable battery connected to the charging circuit 10 is short-circuited, i.e., the $1^{st}$ rechargeable battery is not connected to the charging circuit 10. Similarly, when the mechanical switch K6 is turned on, the $2^{nd}$ rechargeable battery connected to the charging circuit 10 is short-circuited, i.e., the $2^{nd}$ rechargeable battery is not connected to the charging circuit 10. Further, the charging protection circuit can determine whether the battery is fully charged through hardware. When all the rechargeable batteries are fully charged, the charging protection circuit provides a signal to the driving circuit, so that the driving circuit turns off the charging mode to finish the charging process of the batteries.

Figure 5:
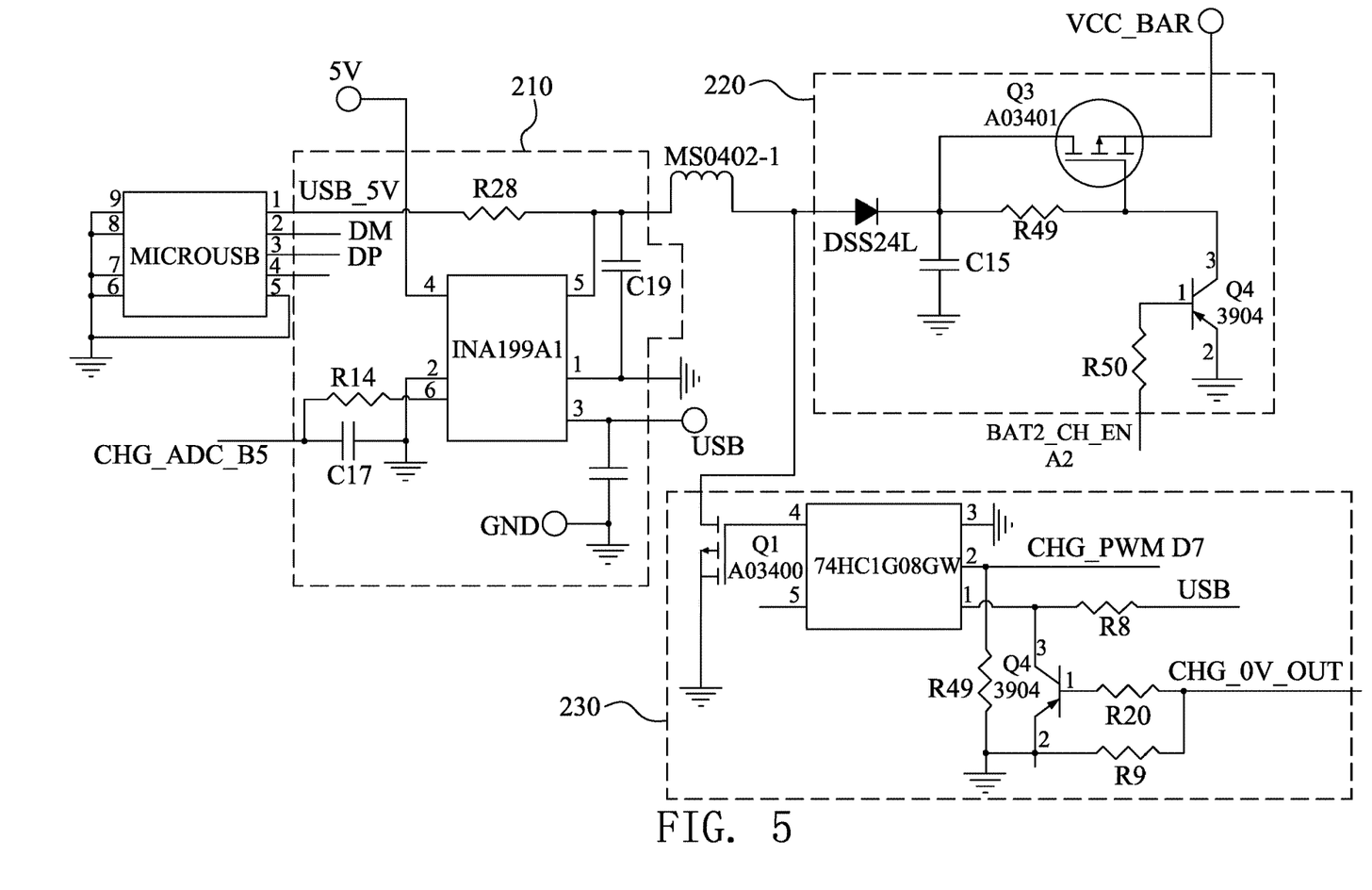
FIG. 5 is a circuit diagram of a boosting charging circuit according to an embodiment.

As shown in FIG. 5, it is a schematic diagram of a boosting charging circuit according to an embodiment. The boosting charging circuit includes a voltage boosting chip 210, a logic switching transistor 220, and a dual input AND gate chip 230. The first input terminal of the voltage boosting chip 210 is connected to the charging interface 100, and the second input terminal is connected to the logic switching transistor 220 and the dual input AND gate chip 230. The voltage boosting chip 210 may be an integrated circuit chip of INA199 series, the logic switching transistor 220 may be a low voltage MOS field effect transistor AO3401, and the dual input AND gate chip 230 may be an integrated circuit chip 74HC1G08GW. As a voltage output and current shunt monitor, the integrated circuit chip of INA199 series can boost the voltage of the charging interface 100 when the number of rechargeable batteries is greater than or equal to two, to ensure that the batteries are charged normally and to improve charging efficiency.

Figure 6:
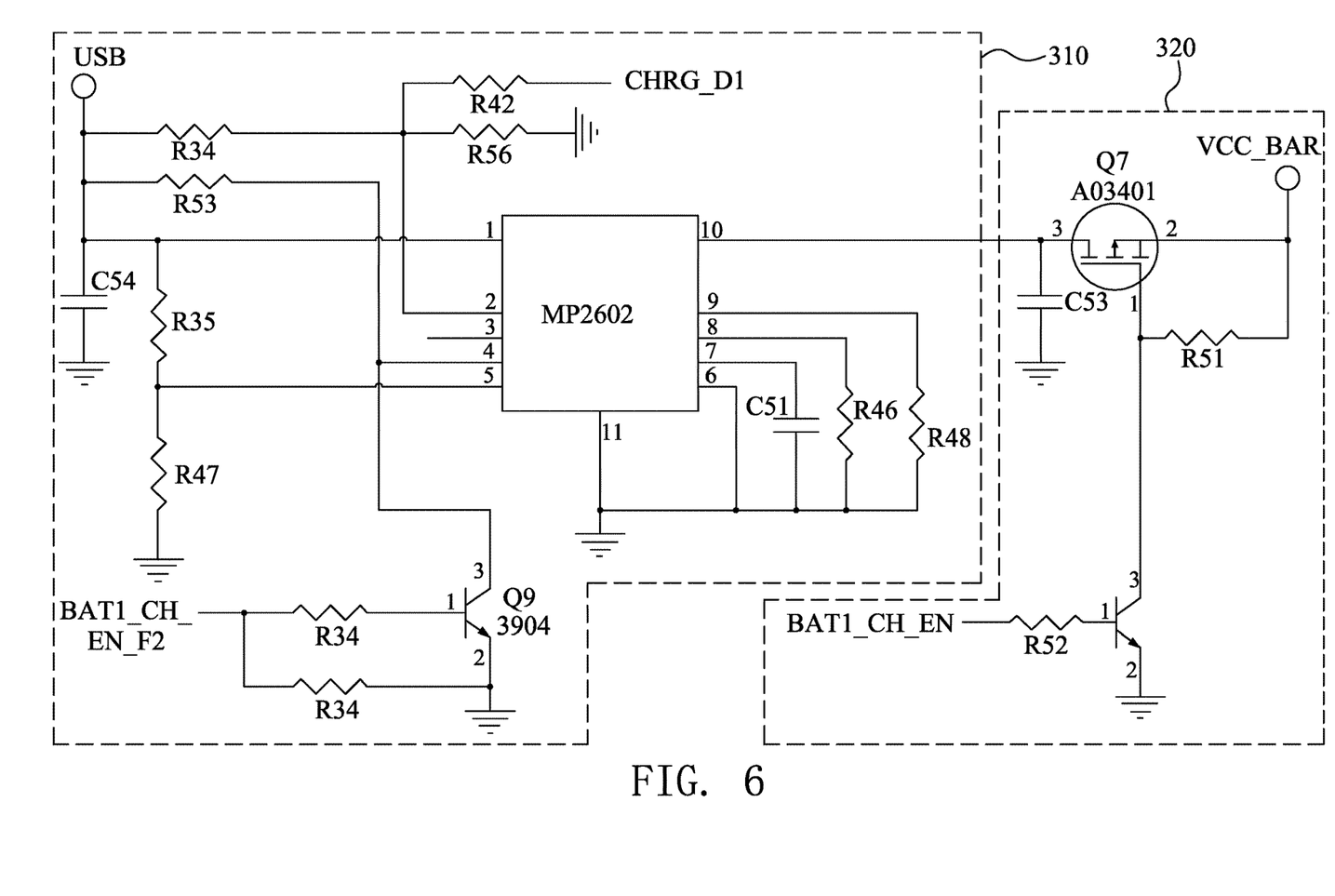
FIG. 6 is a circuit diagram of a buck charging circuit according to an embodiment.

As shown in FIG. 6, it is a schematic diagram of a buck charging circuit according to an embodiment. The buck charging circuit includes a voltage conversion chip 310 and a logic switching transistor 320. The input end of the voltage conversion chip 310 is connected to the charging interface 100, and the output end is connected to the logic switching transistor 320. The voltage conversion chip 310 is mainly composed of an integrated circuit chip MP2602, and the integrated circuit chip MP2602 may be used as a linear, high-performance lithium ion battery charger chip. The logic switching transistor 320 is mainly composed of a low voltage MOS field effect transistor AO3401. Usually, the maximum voltage of a single 18650 lithium battery is 4.2V, so a buck circuit is needed to ensure the charging safety. When there is only one rechargeable battery in the circuit, the integrated circuit chip MP2602 can reduce the charging voltage to a required charging voltage of the lithium battery, to ensure the charging safety.

Figure 7:
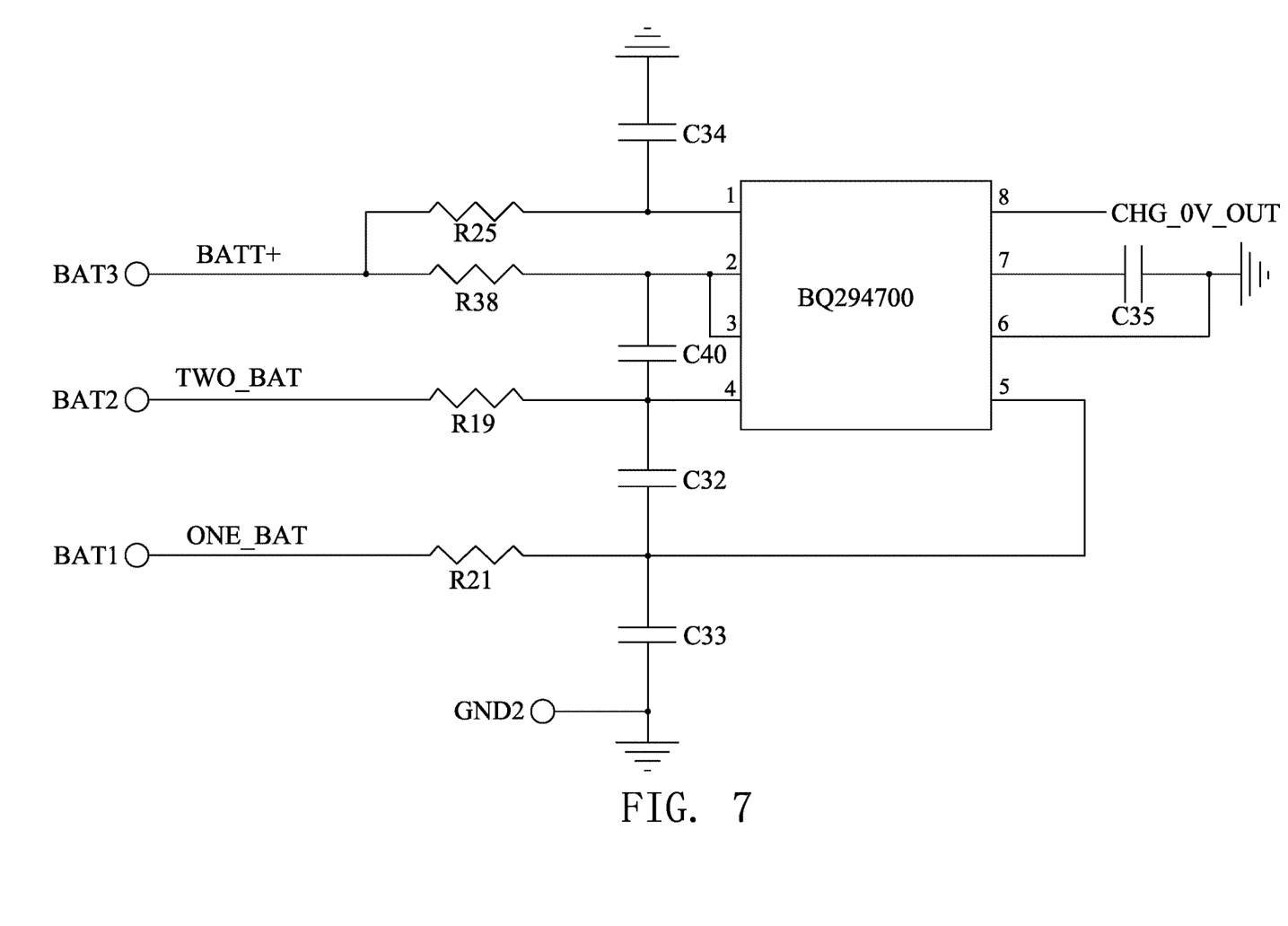
FIG. 7 is a circuit diagram of a charging protection circuit according to an embodiment.

As shown in FIG. 7, it is a schematic diagram of a charging protection circuit according to an embodiment. The charging protection circuit is mainly composed of an integrated circuit chip BQ294700 in order to provide circuit protection. When all the batteries are fully charged, the charging protection circuit will provide a signal to the driving circuit, so that the driving circuit turns off the charging mode to finish the charging process of the batteries, thereby avoiding battery damage caused by overcharging of the batteries.

Figure 8:
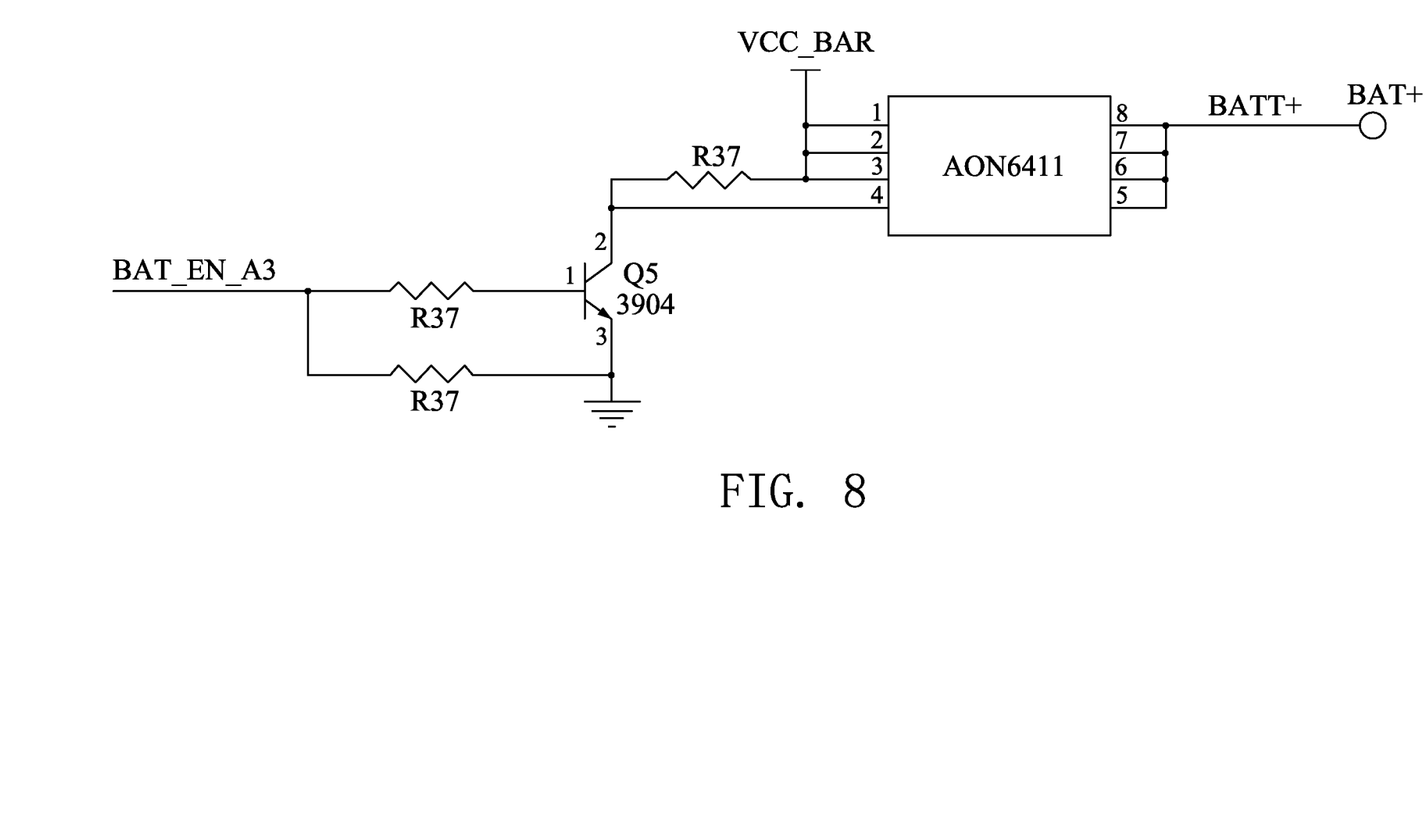
FIG. 8 is a circuit diagram of an anti-reverse protection circuit according to an embodiment.

As shown in FIG. 8, it is a schematic diagram of an anti-reverse protection circuit according to an embodiment. The anti-reverse protection circuit is mainly composed of a P-channel MOSFET and a triode. A model of the P-channel MOSFET may be AON6411. The MOS transistor is connected between the power supply and the load through the S pin and the D pin. The resistor R37 provides a voltage offset for the MOS transistor, and the switching characteristics of the MOS transistor are used to control the ON/OFF of the circuit, to prevent damage to the load caused by reverse connection of the power supply.

The technical features of the above-described embodiments may be arbitrarily combined. For the sake of brevity, all possible combinations of the technical features in the above embodiments are not described. However, as long as there is no contradiction between the combinations of these technical features, they should be considered as the scope of this description.

The above-described embodiments are merely illustrative of several embodiments of the present disclosure, and the description thereof is much specific and detailed, but is not to be construed as limiting the scope of the present disclosure. It should be noted that a number of variations and modifications may be made by those skilled in the art without departing from the spirit and scope of the present disclosure. Therefore, the scope of the present disclosure should be determined by the appended claims.

What is claimed is:

1. A power supply structure, comprising at least two rechargeable batteries connected in series and a charging circuit connected to the rechargeable batteries for charging the rechargeable batteries;

wherein the power supply structure further comprises a switching circuit connected to the at least two rechargeable batteries, the switching circuit is configured for regulating the number of the rechargeable batteries connected in series to form different battery series circuits;

the charging circuit comprises a charging interface, a boosting module, a buck module, a controller and a voltage sampling module, the charging interface is configured for accessing an external power source to obtain a standard charging voltage, the charging interface is respectively connected to the battery series circuits through the boosting module and the buck module, the controller is respectively connected to the boosting module and the buck module, the voltage sampling module is connected between the controller and the battery series circuits and configured for detecting the voltages of the battery series circuits and feeding the detected voltages back to the controller, so that according to the detected voltages, the controller selectively controls the boosting module or the buck module to operate for converting the standard charging voltage into different charging voltages so as to be supplied to the battery series circuits for charging;

the boosting module comprises a first switch, a boosting charging circuit, a boosting charging protection circuit and a second switch connected sequentially in series, the gate of the first switch and the gate of the second switch are connected to each other and are connected to the controller, the drain of the first switch is connected to the charging interface, the source of the first switch is connected to the boosting charging circuit, the drain of the second switch is connected to the boosting charging protection circuit, the source of the second switch is connected to the rechargeable batteries;

the buck module comprises a third switch, a buck charging circuit, a buck charging protection circuit and a fourth switch connected sequentially in series, the gate of the third switch and the gate of the fourth switch are connected to each other and are connected to the controller, the drain of the third switch is connected to the charging interface, the source of the third switch is connected to the buck charging circuit, the drain of the fourth switch is connected to the buck charging protection circuit, the source of the fourth switch is connected to the rechargeable batteries;

when the controller controls the third switch and the fourth switch to be turned on, and simultaneously, controls the first switch and the second switch to be turned off, the buck module is selected to operate for charging;

when the controller controls the third switch and the fourth switch to be turned off, and simultaneously, controls the first switch and the second switch to be turned on, the boosting module is selected to operate for charging.

2. The power supply structure according to claim 1, wherein the boosting charging circuit comprises a voltage boosting chip, a logic switching transistor and a dual input AND gate chip, a first input terminal of the voltage boosting chip is connected to the charging interface, and a second input terminal is connected to the logic switching transistor and the dual input AND gate chip.

3. The power supply structure according to claim 1, wherein the buck charging circuit comprises a voltage conversion chip and a logic switching transistor, an input end of the voltage conversion chip is connected to the charging interface, and an output end is connected to the logic switching transistor.

4. The power supply structure according to claim 1, wherein the charging interface is a USB interface.

5. The power supply structure according to claim 1, wherein the voltage sampling module comprises voltage sampling units equaling to the number of the rechargeable batteries, and each voltage sampling unit collects the voltage of a corresponding rechargeable battery and feeds back to the controller.

6. An electronic cigarette, comprising an atomizer and the power supply structure according to claim 1, wherein the power supply structure is connected to the atomizer for supplying power to the atomizer.

* * * * *